Dec. 28, 1954
P. SUSSENBACH
2,698,269
COMPRESSIBLE PACKING
Filed July 15, 1949
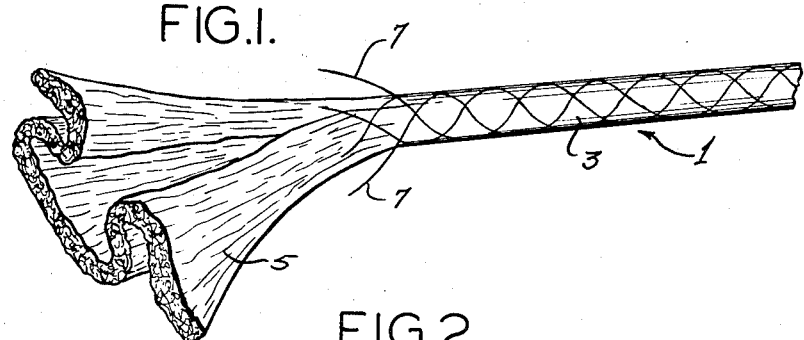
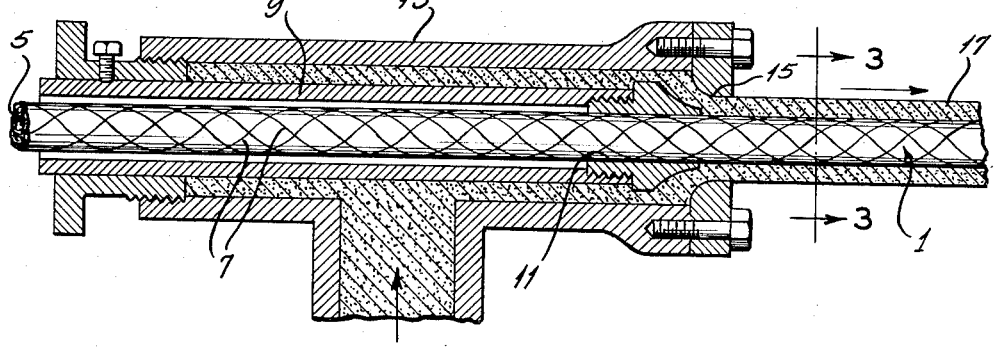
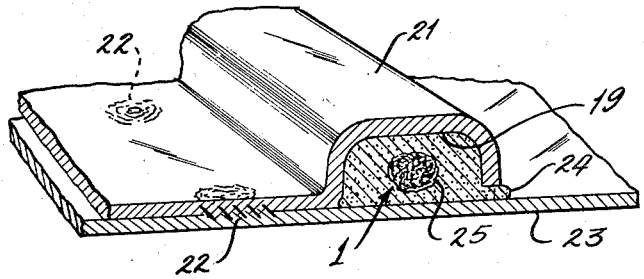
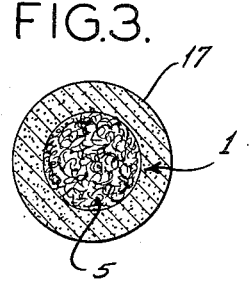
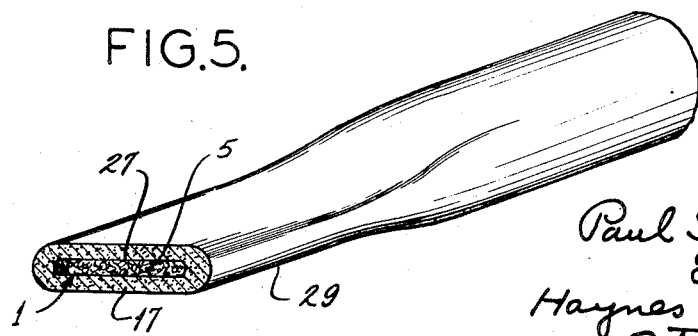
Paul Sussenbach,
Inventor.
Haynes and Koenig
Attorneys.

United States Patent Office 2,698,269
Patented Dec. 28, 1954

2,698,269

COMPRESSIBLE PACKING

Paul Sussenbach, Brentwood, Mo., assignor to The Presstite Engineering Company, St. Louis, Mo., a corporation of Missouri Application July 15, 1949, Serial No. 105,020

1 Claim. (Cl. 154—53.6)

This invention relates to deformable and compressible packing, and with regard to certain more specific features, to a preformed waterproof packing for sealing joint pockets between adjacent members of articles such as refrigerators, automobile bodies and the like.

Briefly, the invention comprises an easily deformable packing of a preferably round rope-like nature having a preferably tacky plastic exterior relatively thick skin which is organized around a bulky fluffy compressible core. The core has a high order of compressibility and resiliency which, taken in connection with the tacky characteristic of the exterior of the skin, permits material to be successfully used in joints having wide tolerances. For example in welding joints, members may be clamped together for the welding operation. When the clamps are removed after welding the members may tend again to spring apart. The tacky nature of the skin and the expansible characteristic of the core assures that the joints will remain infilled and sealed after they have sprung. Moreover, the rope-like form constituting the packing is extremely deformable, so that it may follow odd contours of joints without buckling. Other features will be in part apparent and in part pointed out hereinafter.

The invention accordingly comprises the elements and combinations of elements, ingredients and combinations of ingredients, and proportions thereof, features of construction and composition, and arrangements of parts which will be exemplified in the structures and products hereinafter described, and the scope of the application of which will be indicated in the following claim.

In the accompanying drawings, in which one of various possible embodiments of the invention is illustrated, Fig. 1 is a perspective view of one form of wadding, showing the near end splayed open for better description of its characteristics;

Fig. 2 is a diagrammatic longitudinal section through an extrusion head, illustrating the formation of a plastic sheath on the wadding;

Fig. 3 is a cross sectional view of the packing constituting the invention, being taken on line 3—3 of Fig. 2;

Fig. 4 is a cross sectional view showing an application of the invention to a typical joint; and, Fig. 5 is a cross section of a segment of the packing illustrated as being flattened under compression.

Similar reference characters indicate corresponding parts throughout the several views of the drawings.

Referring now more particularly to Fig. 1, there is shown at numeral 1 a resilient core of wadding composed of a rope of dry fluffy material. In the case of Fig. 1, this material is illustrated as being composed of sheets or bats of fluffy cellulose such as paper or cotton, as indicated at 5; or these sheets may be composed of creped tissue, paper, loosely woven fabric or the like. These sheets or bats are loosely compacted or bundled together into a cylindric form and are held together by an open-mesh network of threads 7. If desired, the core 1 may be composed of a comparable loose resilient jute or analogous fibrous material having little, if any, twist, so that it is not of a tightly compact nature but resilient. Material of the type described has inherently low tensile strength but sufficient for the purposes of the invention.

The core 1 is drawn through a tube 9 having an outlet 11 which closely fits around the core but allows it to be drawn out, as shown by the arrow. Around the tube 9 is a manifold 13 having a circular outlet 15 beyond the outlet 11. Plastic material, which will be described below, is forced from the manifold 13 through the outlet 15, being thus extruded as a thick skin or tubular sheath 17 around the core 1. The process of manufacture is continuous, except that suitable lengths of the material being cut off at desired intervals.

Fig. 3 shows a cross section of a typical segment of the material in which, for example, the core 1 is 3/8 inch in outside diameter, and the outside diameter of the skin 17 is 5/8 inch. This makes the skin thickness 1/8 inch. Thus the skin thickness is substantially less than the diameter of the fluffy core 1 and preferably, as shown, less than the radius of this core. Thus although the substance of skin 17 is substantially incompressible (though deformable), the packing has the ability, because of the compressible character of the core 1, to be greatly compressed even in a confined space, which is untrue of similar packings made solidly out of material such as 17 or with a core of less bulk and compressibility such as an ordinary string, twine or the like. This is illustrated in Fig. 4, in which the sealing material is shown to have been inserted into a groove 19 between a channel member 21 spot welded at 22 to a plate 23. In this case, the skin 17 is deformed into a more or less rectangular shape, whereas the formerly fluffy core 1 is compressed as shown at 25. The packing seals at the opening 24 and at any openings between the spot welds. In general, the core material is compressible from a first volume to a second volume which is less than one-half of the first volume.

In Fig. 5 is shown how the packing may deform without confinement. In this case, the core 1 has been flattened out, as indicated at numeral 27, the cylindric shape of the skin 17 being also flattened, as indicated at 29.

An important point to be observed is that should the compressed sections of either Figs. 4 or 5 be released, they will spring back substantially to the shape shown in Fig. 3. Thus in applying packing to joints such as in automobile fenders and the like, which are sometimes deformed temporarily, the material follows successive deformations to maintain a seal. A specific example is a case in which two parts are brought together by clamps, one of them having a pocket into which the packing rope is inserted. The pieces are then welded and the clamps removed. Often in such an operation the parts will spring apart slightly when the clamps are removed. The packing of the present invention will then re-expand by reason of the substantial expansiveness of the fluffy core 1. This action is due in part to the fact that the tacky skin 17 attaches itself to the pieces and moves out with them. Being tacky, it also becomes attached to, but only to, the outside surface of the core, so as to aid in its expansive action. Thus all of the pocket remains infilled with the packing. It will be understood that the joint is sealed by the waterproof characteristic of the skin 17, which also protects the core 1.

Thus it will be seen that the skin 17 should be highly deformable and externally tacky or adhesive so that it may be applied to surfaces and stick to them, and so that it adheres to the core 1. The material is required also to be waterproof and not to age unduly over a period of years. A suitable plastic for the purpose is as follows:

*Formula No. 1*

| Material: | Parts by weight |
|---|---|
| Poly isobutylene; mol. wt. 60,000 (Vistanex) | 10.0 |
| Poly isobutylene; mol. wt. 8,000–20,000 (Vistanex) | 29.5 |
| Asphalt (highly blown petroleum type) | 30.0 |
| Micro crystalline wax 150 M. P. | 30.0 |
| Sulfur | .5 |
| | 100.0% |

In the above formula, the first item which is the base is an unvulcanized elastomer. The next three items are compounding materials which affect the base material so that it may be extruded as described. These include a tackifier, plasticizer and extender. The sulfur acts as a stabilizer.

Another formula which has been found suitable is as follows:

Formula No. II

| Material: | Parts by weight |
|---|---|
| Butyl reclaim | 28.0 |
| Heavy motor oil S. A. E. 80 | 28.0 |
| Micro crystalline wax 150 M. P | 22.0 |
| Calcium silicate | 22.0 |
| | 100.0% |

In the second formula, the basic elastomer is the first item. The next two items are compounding materials which affect the base material so that it may be extruded as described. These include a plasticizer and extender. The last item is a filler.

Although both formulas are satisfactory, the first is preferable, since the effect of the 8,000–20,000 molecular weight poly isobutylene as a tackifier is substantial.

Other plasticizers and extenders which are compatible with the elastomer may be used. Among the suitable materials are native, blown and steam-refined asphalts; heavy petroleum distillates; castor oils; aromatics containing unsaturated side chains extracted from lubricating oils, etc.; heavy petroleum derivatives including aromatic, naphthenic and aliphatic hydrocarbons and combinations thereof.

Alternative tackifiers which are compatible with the elastomer may be employed. Among these are poly isobutylenes of lower molecular weight and polymerized iso-olefins having a molecular weight of 500–1500.

Other elastomers than those referred to above may be used. Among these are Buna S (GR–S), poly isobutylene, butyl (GR–I), natural crepe rubber, and reclaimed rubbers (e. g., natural, Buna S, poly isobutylene, butyl).

Other organic or inorganic fillers may be used, including asbestos fibre, whiting (calcium carbonate), silica sand (200 mesh or finer), carbon black, aluminum silicates, mica (pigment grade), wood flour and cork. Instead of sulfur as a stabilizer in Formula I, other customary stabilizers such as diphenyl ethylene diamine or ethylene diamine may be used.

As pointed out above, a wide range of materials may be employed. The proportions are also subject to variations. For example, the materials and their ranges are as follows:

| Material: | Range, percent |
|---|---|
| Elastomer | 12–75 |
| Tackifier | 0–10 |
| Plasticizers and extenders | 20–70 |
| Filler | 0–68 |
| Stabilizer | 0–3 |

Wherever a range is indicated as including zero, it is to be understood that the particular item may in some circumstances be omitted.

If desired, the materials forming the skin 17 may be the same as that described in the copending application of William C. Ferguson and myself, Serial No. 714,802, filed December 7, 1946, for Packings and Methods of Making Same, subsequently abandoned. The composition described therein comprises:

| Material: | Parts by weight |
|---|---|
| Elastomer | 20–45 |
| Highly blown asphalt | 50–80 |
| Stabilizer | 0–5 |
| Tackifier | 0–10 |

Suitable inert filler materials, such as whiting, silica dust, asbestos, wood flour or the like, may be added to the above-described base if desired. The proportion of filler in the composition may range from 0–50% by weight. Fillers with low oil absorption properties, such as silica dust, may be used in high percentages. Fillers with high oil absorption properties, such as asbestos and wood flour, should be used in low percentages. Thus, the asphaltic composition may consist of from 50–100% by weight of the base, and from 0–50% filler.

The above compositions are in general flexible but have a low elastic limit. They have a tacky characteristic, the elastomers being unvulcanized or uncured. It may be noted that the core 1, although of inherently low tensile strength, is sufficiently strong to serve to some extent to prevent ordinary tension on the finished material from unduly stretching it. The material will withstand a temperature as high as 350° F.

The product herein described may be stated to have a skin of a deformable tacky elastomer formed around a mass of resilient material which may be referred to as wadding. The thickness of the skin is less than the average thickness of the wadding. The diameter of the wadding in the case of a cylindric section is its thickness.

In view of the above, it will be seen that the several objects of the invention are achieved and other advantageous results attained.

As many changes could be made in the above constructions and products without departing from the scope of the invention, it is intended that all matter contained in the above description or shown in the accompanying drawings shall be interpreted as illustrative and not in a limiting sense.

I claim:

A preformed rope-like deformable waterproof packing of low resiliency and high compressibility adapted for use between adjacent members forming a joint, said packing comprising a dry fluffy bulky core which is substantially compressible, said core being composed of bunched but essentially loose cellulose batting, and a tacky seamless deformable thick plastic sheath around said core consisting of a tacky elastomer adapted for adherence both to the outside surface only of the core and to the joint-forming members, the thickness of said sheath being substantially less than the diameter of the core, said plastic sheath having substantially the following composition:

| Material: | Parts by weight |
|---|---|
| Poly isobutylene; mol. wt. 60,000 | 10.0 |
| Poly isobutylene; mol. wt. 8,000–20,000 | 29.5 |
| Asphalt (highly blown petroleum type) | 30.0 |
| Micro crystalline wax 150 M. P | 30.0 |
| Sulfur | .5 |
| | 100.0% |

References Cited in the file of this patent

UNITED STATES PATENTS

| Number | Name | Date |
|---|---|---|
| 64,995 | Miller | May 21, 1867 |
| 311,593 | Mark | Feb. 3, 1885 |
| 727,055 | Arnold | May 5, 1903 |
| 1,085,584 | Bond | Jan. 27, 1914 |
| 1,455,894 | Stockton | May 22, 1923 |
| 1,494,346 | Eastman et al | May 20, 1924 |
| 1,729,632 | Stone | Oct. 1, 1929 |
| 1,821,582 | Sackner | Sept. 1, 1931 |
| 1,940,924 | Taylor | Dec. 26, 1933 |
| 1,942,489 | Pfefferle | Jan. 9, 1934 |
| 2,099,910 | Thiel | Nov. 23, 1937 |
| 2,116,277 | Meerbeck | May 3, 1938 |
| 2,206,899 | Kellgren | July 9, 1940 |
| 2,208,619 | Armor et al. | July 23, 1940 |
| 2,337,986 | Fry | Dec. 28, 1943 |
| 2,356,955 | Thomas | Aug. 29, 1944 |
| 2,388,984 | Mack | Nov. 13, 1945 |
| 2,416,798 | Ferguson | Mar. 4, 1947 |
| 2,425,293 | McDermott | Aug. 12, 1947 |
| 2,445,231 | McDermott | July 13, 1948 |
| 2,534,883 | Smyers | Dec. 19, 1950 |

FOREIGN PATENTS

| Number | Country | Date |
|---|---|---|
| 382,623 | Great Britain | Oct. 27, 1932 |
| 513,521 | Great Britain | of 1939 |